United States Patent
Ito et al.

(10) Patent No.: US 7,812,859 B2
(45) Date of Patent: Oct. 12, 2010

(54) PRINT SYSTEM AND PRINT CONTROL METHOD

(75) Inventors: Noriaki Ito, Tokyo (JP); Shinichi Yuga, Kanagawa (JP); Nobushige Aoki, Kanagawa (JP); Yurika Kadoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1337 days.

(21) Appl. No.: 10/687,746

(22) Filed: Oct. 20, 2003

(65) Prior Publication Data

US 2004/0080778 A1   Apr. 29, 2004

(30) Foreign Application Priority Data

Oct. 28, 2002   (JP) ............................. 2002-313107

(51) Int. Cl.
  *H04N 9/004*   (2006.01)
  *G06F 3/014*   (2006.01)
  *G06F 3/012*   (2006.01)

(52) U.S. Cl. .............................. 348/207.1; 348/207.99; 348/207.2; 358/1.9; 358/1.13; 358/1.15; 358/1.16

(58) Field of Classification Search .................. 358/1.1, 358/1.6, 1.13–1.18, 909.1; 348/207.2, 207.99, 348/207.1, 333.05, 333.01, 207.11
See application file for complete search history.

(56) References Cited

U.S. PATENT DOCUMENTS

| | | | | |
|---|---|---|---|---|
| 5,974,401 | A * | 10/1999 | Enomoto et al. | 705/40 |
| 6,011,547 | A * | 1/2000 | Shiota et al. | 382/254 |
| 6,115,137 | A * | 9/2000 | Ozawa et al. | 358/1.6 |
| 6,198,526 | B1 * | 3/2001 | Ohtsuka | 355/40 |
| 6,307,640 | B1 * | 10/2001 | Motegi | 358/1.14 |
| 6,668,134 | B1 * | 12/2003 | Niikawa | 386/95 |
| 6,867,882 | B1 * | 3/2005 | Takahashi | 358/1.6 |
| 6,947,075 | B1 * | 9/2005 | Niikawa | 348/211.14 |
| 6,948,792 | B2 * | 9/2005 | Narusawa et al. | 347/19 |
| 7,042,500 | B1 * | 5/2006 | Niikawa | 348/207.1 |
| 7,161,618 | B1 * | 1/2007 | Niikawa et al. | 348/207.1 |

(Continued)

FOREIGN PATENT DOCUMENTS

JP   2001-268543   9/2001

(Continued)

OTHER PUBLICATIONS

U.S. Appl. No. 10/681,152, filed Oct. 9, 2003.

*Primary Examiner*—Twyler L Haskins
*Assistant Examiner*—Chad Dickerson
(74) *Attorney, Agent, or Firm*—Fitzpatrick, Cella, Harper & Scinto

(57) ABSTRACT

To display a print preview to which an operating instruction from an operation panel provided for an external operating apparatus, an interruption event which is transferred from the external operating apparatus 111 to a host computer 101 is detected every instruction of the operation panel provided for the external operating apparatus 111, image data which is read out from a memory card which can be loaded into the external operating apparatus 111 and a print setting which is set are obtained in accordance with the detected interruption event, and a preview display unit 305 controls a print preview display in which the print setting has been reflected to a display device of the host computer 101 and an updating display of the print preview display.

11 Claims, 9 Drawing Sheets

U.S. PATENT DOCUMENTS

| | | | |
|---|---|---|---|
| 7,196,813 B2 * | 3/2007 | Matsumoto | 358/1.3 |
| 2002/0135687 A1 * | 9/2002 | Nakajima et al. | 348/231.3 |
| 2002/0140693 A1 * | 10/2002 | Nakami et al. | 345/418 |
| 2002/0140827 A1 * | 10/2002 | Okisu et al. | 348/222.1 |
| 2002/0196346 A1 * | 12/2002 | Nishio et al. | 348/207.2 |
| 2003/0035127 A1 * | 2/2003 | Nakami | 358/1.9 |
| 2004/0201689 A1 * | 10/2004 | Quintana et al. | 348/207.1 |

FOREIGN PATENT DOCUMENTS

| | | | |
|---|---|---|---|
| JP | 2004139385 A | * | 5/2004 |
| JP | 2004139386 A | * | 5/2004 |

* cited by examiner

FIG. 9

STORAGE MEDIUM SUCH AS FD/CD-ROM

| DIRECTORY INFORMATION |
|---|
| FIRST DATA PROCESSING PROGRAM<br>PROGRAM CODE GROUP CORRESPONDING TO STEPS IN FLOWCHART SHOWN IN FIG.5 |
| SECOND DATA PROCESSING PROGRAM<br>PROGRAM CODE GROUP CORRESPONDING TO STEPS IN FLOWCHART SHOWN IN FIG.6 |

PRINT SYSTEM AND PRINT CONTROL METHOD

BACKGROUND OF THE INVENTION

1. Field of the Invention

The invention relates to control of a print system in which an external operating apparatus, a printer, and a host computer each having a communication interface for mutually transmitting and receiving information in a real-time manner are connected so that they can communicate with each other via an interruption control signal and a printer driver.

2. Related Background Art

Hitherto, generally, in the case of using a printer to print a digital image photographed by a digital camera or the like, the digital image is stored into a hard disk on a PC (Personal Computer) and, thereafter, browsed, edited, and printed by using software on the PC.

Among recent printers, there is a printer having a card slot for inserting a recording medium which is used in the digital camera or the like and an operation panel for receiving a print setting instruction from the user, and having a function of printing a digital image in the recording medium by the printer alone without being connected to a PC.

Among such printers, there is also a printer such that the image is displayed by a dedicated LCD (Liquid Crystal Display) monitor equipped for the printer or an externally-connected monitor and setting and printing can be executed by using the operation panel while looking at contents displayed on the monitor.

However, in the conventional general printing method via the host PC, the operation of a mouse or a keyboard is accompanied, it is indispensable to execute the operation of software on the PC, and it is not always easy to print.

In the case of the printer having the card slot and the operation panel, although the operation is easy, there is a problem such that a display screen of the operation panel and the dedicated monitor are small and it is difficult to perform print setting and browse the image. Further, since the printing is executed solely by the printer, resources such as CPU, memory, and the like of the printer are costly and there is a case where print speed and print quality are inferior to those in printing via the host PC.

SUMMARY OF THE INVENTION

It is an object of the invention to solve all or at least one of the above problems.

To accomplish the above object, a print system of the present invention comprises an external operating apparatus, a host computer which communicates with the external operating apparatus, and a printer which communicates with the host computer, wherein the external operating apparatus comprises an operation panel which receives a print setting instruction from the user, an operation panel controller for generating an interruption event corresponding to the print setting instruction each time the instruction is made to the operation panel, and reading means for reading out image data from a storage medium, wherein the host computer comprises a receiving unit for receiving the image data read out from the storage medium, a display control unit for receiving the interruption event from the external operating apparatus and effecting a preview display in which the print setting instruction is reflected to the image data received by the receiving unit, and a print control unit for generating print data corresponding to the print setting instruction, and wherein the printer prints the print data outputted from the host computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a diagram for explaining a memory map of a storage medium for storing various data processing programs which can be read out by the print system of the embodiment.

DETAILED DESCRIPTION OF THE PREFERRED EMBODIMENT

Figure 1:
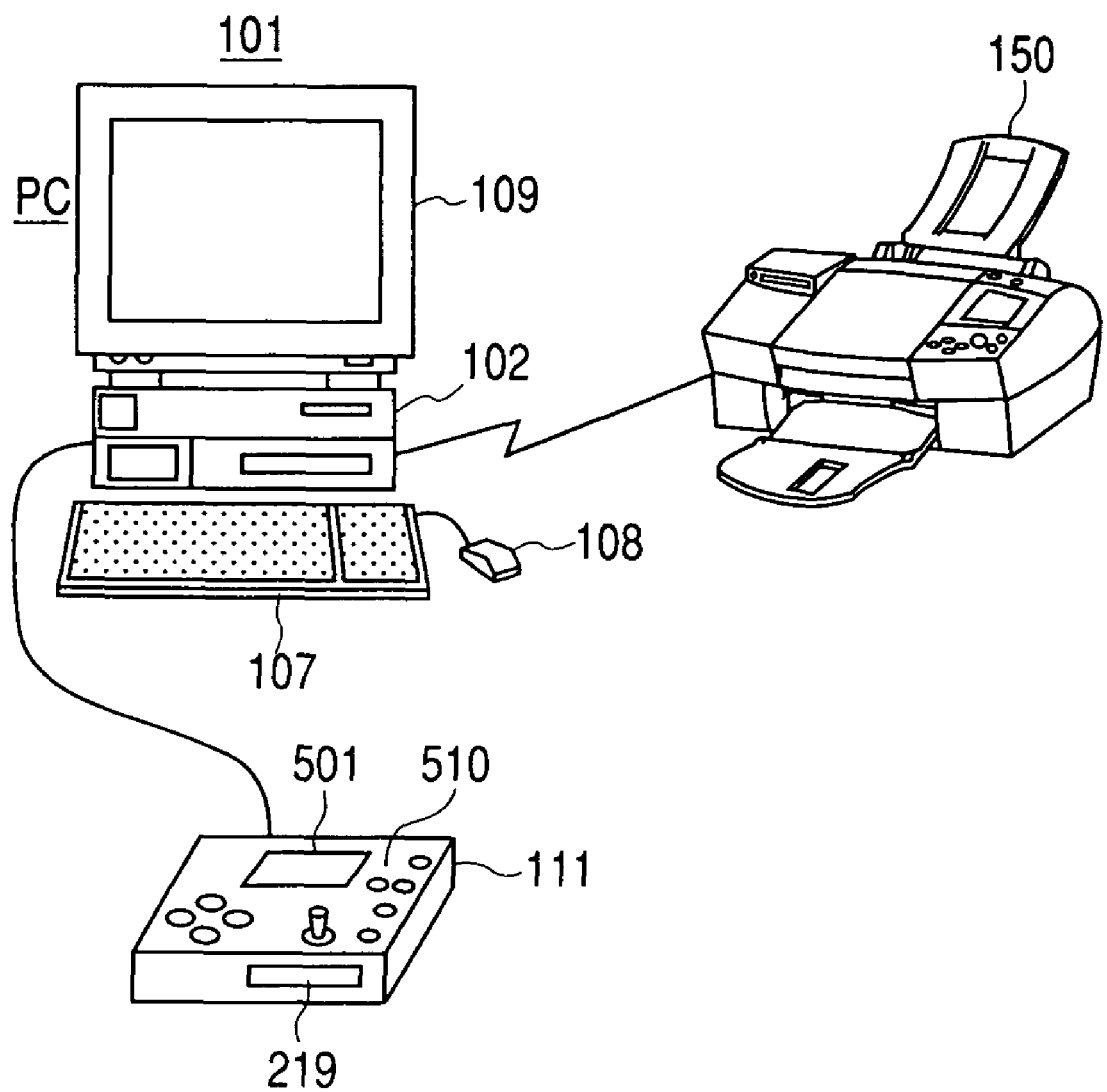
FIG. 1 is a diagram showing an example of a print system of an embodiment.

FIG. 1 is a diagram showing an example of a print system of an embodiment according to the invention. FIG. 1 corresponds to an example in which an information processing apparatus 101 (PC including a display device 109, a controller unit 102, input devices 107 and 108, etc.) in which, for example, a file operation application has been installed, an external operating apparatus 111 having a function for reading out image data of a predetermined standard stored in a memory device (memory card) which is loaded into a digital camera or the like, and an ink jet printer (printer 150) for printing a file processed by the file operation application are connected by, for example, a USB interface.

Figure 4:
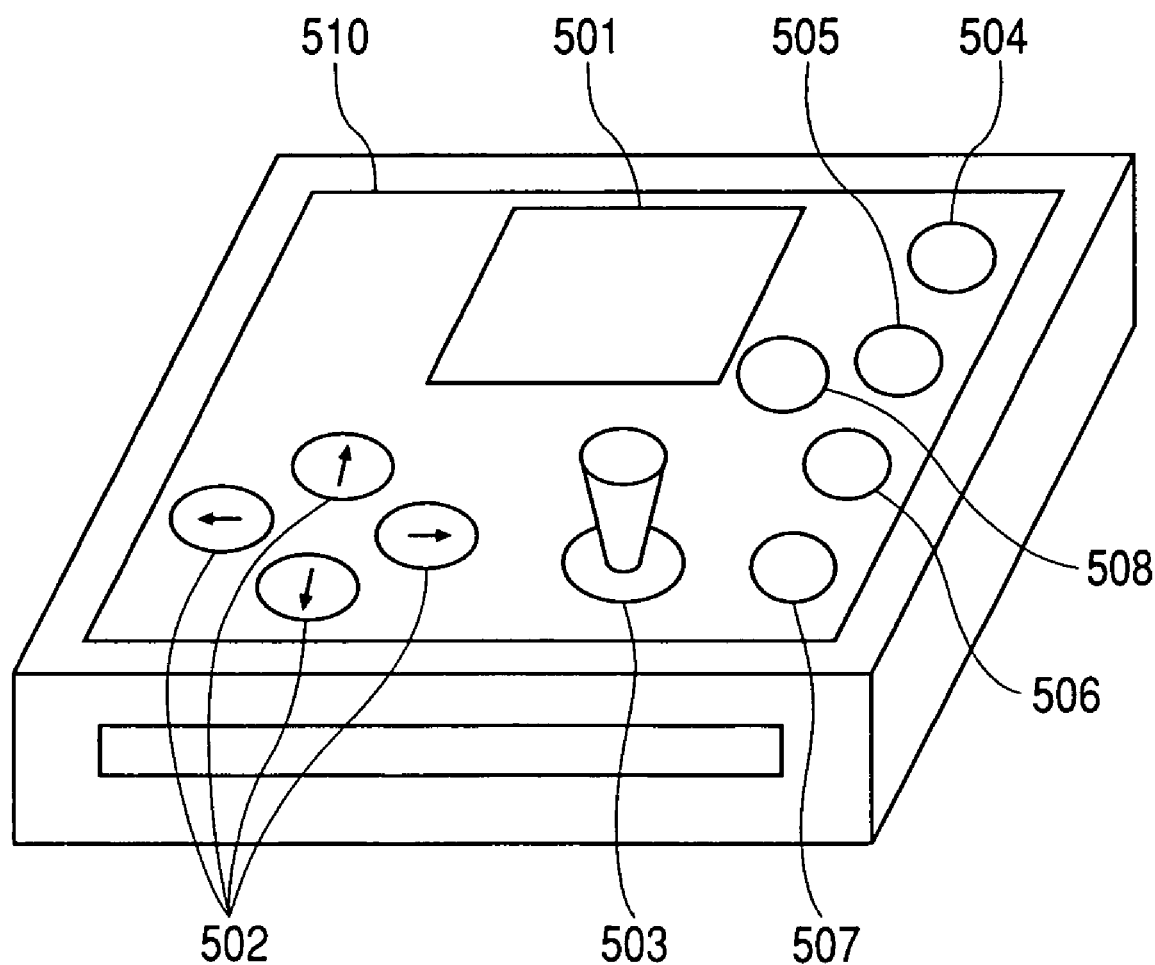
FIG. 4 is a schematic diagram for explaining a detailed construction of an operation panel of an external operating apparatus shown in FIG. 1.

In the external operating apparatus 111 (details are shown in FIG. 4) shown in FIG. 1, reference numeral 219 denotes a media slot which is provided for the digital camera (not shown). A memory device in which photographed image data has been stored is inserted into the media slot 219. Reference numeral 510 denotes an operation panel constructed in a manner such that various operation keys are arranged and a print format can be set by instructing a print setting menu which is displayed on a liquid crystal display (LCD) panel 501.

The print system in the embodiment relates to an example of a system in which the external operating apparatus 111, PC 101, and printer 150 are connected by communicating means (for example, a USB) which can make bidirectional communication. The external operating apparatus 111 includes: a card slot 219 into which a memory card such as a compact flash (registered trademark) or the like can be inserted; the LCD panel 501 for executing various print settings and a printing operation; and the operation panel 510 constructed by buttons.

The print system of the embodiment is constructed in a manner such that an application activation button 504 is arranged on the operation panel 510 and, when the application activation button 504 is pressed, an application on the PC 101 is activated and a preview display based on the print setting set by the operation panel is made.

Further, when the print setting is changed by the operation panel 510, the preview display is always updated. When a print start button 505 is pressed on the operation panel 510 during the operation of the application, an image process necessary for printing is executed on the PC 101 and a printing process is executed.

When the application activation button 504 is again pressed, the above application is terminated.

As mentioned above, according to the print system of the embodiment, the preview can be browsed and the printing can be executed only by the operation of the operation panel of the external operating apparatus.

Details of the print system of the embodiment will be described hereinbelow.

Figure 2:
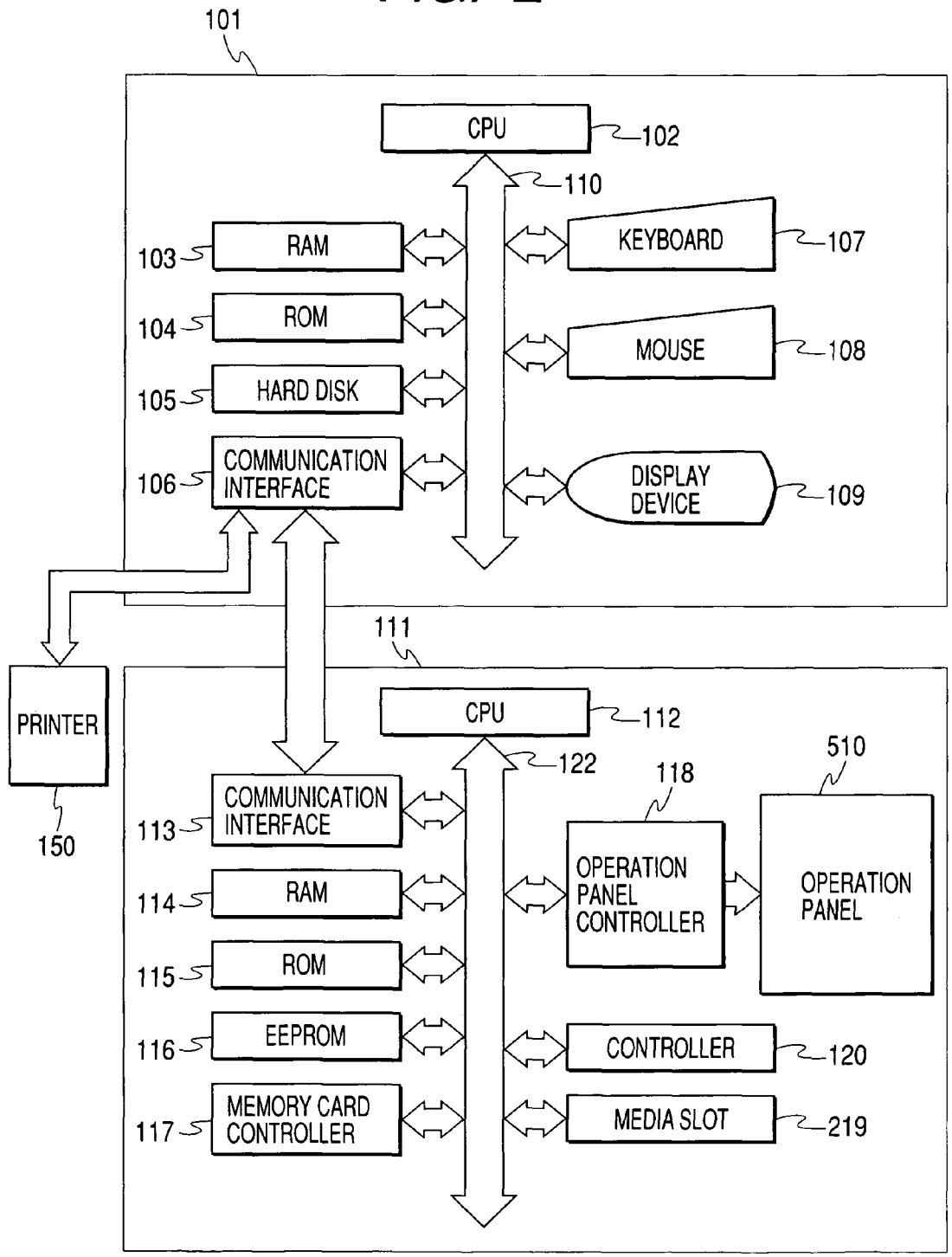
FIG. 2 is a block diagram for explaining a construction of the print system of the embodiment.

FIG. 2 is a block diagram for explaining a construction of the print system showing the embodiment of the invention and corresponds to an example of a fundamental construction of the external operating apparatus 111, personal computer 101 (hereinafter, abbreviated to PC), and printer 150.

In FIG. 2, the PC 101 is constructed by: the central processing unit (CPU) 102 for executing an arithmetic operation of data and commands, discriminating, and controlling; storing apparatuses such as RAM 103, ROM 104, hard disk 105, and the like for storing an operating system (hereinafter, abbreviated to OS) and other control programs; a communication interface 106 such as USB, SCSI, wireless IF, or the like for making data communication with the printer; the input devices such as keyboard 107 and mouse 108 each of which is used as a user interface; the display device 109 comprising a graphic controller, a CRT, and an LCD; and a system bus 110. It is assumed that the file operation application has been installed in the hard disk 105.

The external operating apparatus 111 is constructed by: a central processing unit (CPU) 112 for executing an arithmetic operation of data and commands, discriminating, and controlling; a RAM 114 which is used as a temporary memory area and print buffer of various data; a ROM 115 which is used as a read only memory area of the operating system and other control programs; a non-volatile memory (EEPROM) 116 which is used as a memory area of apparatus setting information or the like; a communication interface 113 for making bidirectional communication with the PC; a memory card controller 117 for reading out data from a memory card; the operation panel 510 and an operation panel controller 118 which are constructed by various buttons and switches that are used for a turn-on of a power source, resetting, various print settings, print start, print stop, and the like, an LED, and an LCD panel; and the media slot 219 in which a recording media such as a memory card or the like is inserted.

In the print system of the embodiment, an example of the case of using a Universal Serial Bus (hereinafter, abbreviated to USB) for communication among the external operating apparatus 111, the PC 101, and the printer 150 will be described. Particularly, the communication interface of the print system in the embodiment corresponds to two data transfer systems such as bulk transfer system suitable for large-capacity data transfer and interruption transfer system suitable for user interface communication using a mouse or the like among the data transfer systems of the USB. Therefore, the bulk transfer system is used in the data transfer of image data or print data and the interruption transfer system is used in the data transfer of operation panel information.

Figure 3:
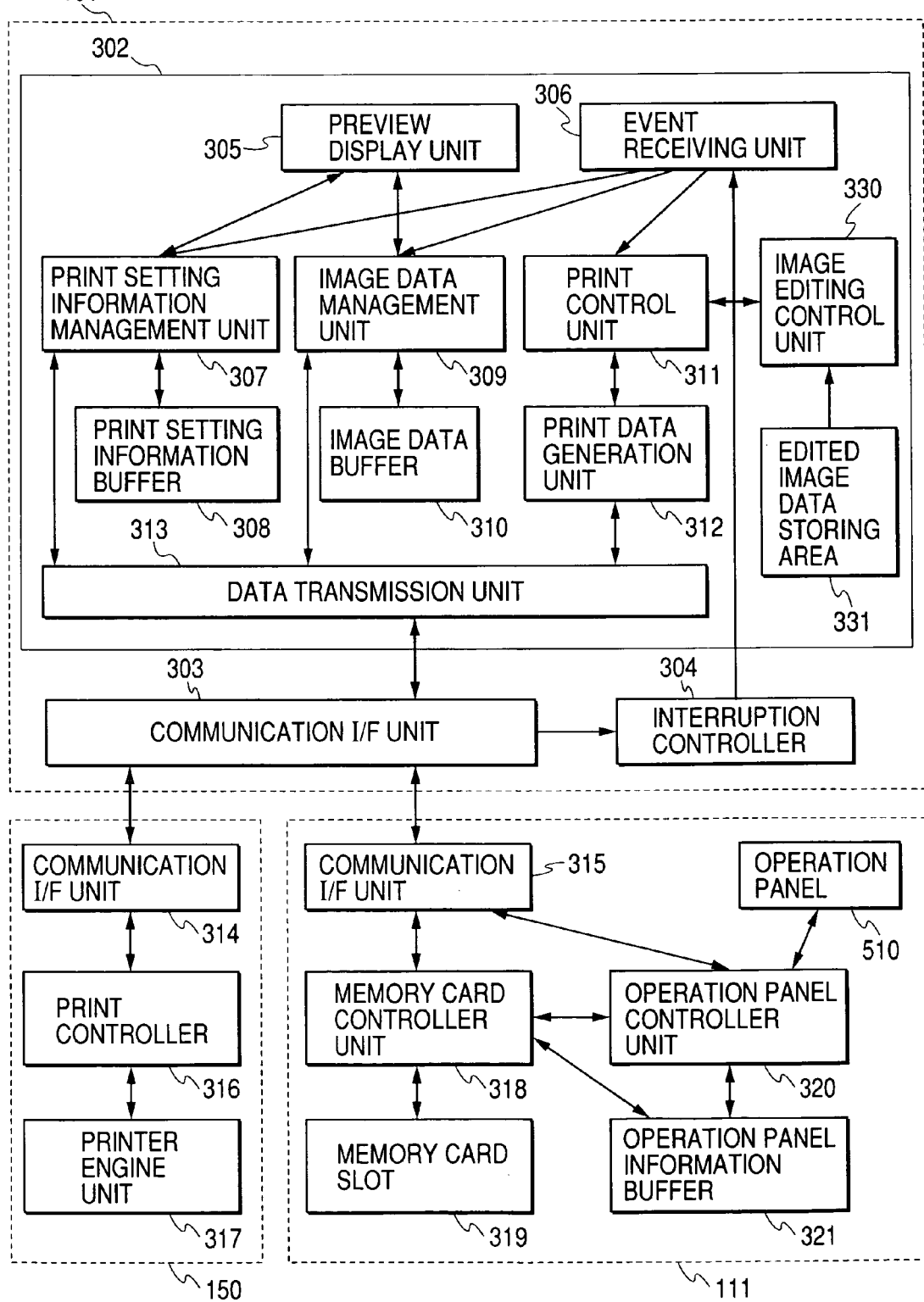
FIG. 3 is a block diagram showing a data processing construction in the print system shown in FIG. 2.

FIG. 3 is a block diagram showing a data processing construction in the print system shown in FIG. 2 and the same component elements as those shown in FIG. 2 are designated by the same reference numerals.

In FIG. 3, a communication interface unit (communication IF unit) 303 is constructed by: a host controller for controlling the bidirectional communication using the USB; a port driver; a hub driver; and the like. Generally, the communication IF unit 303 is implemented in the operation system.

An interruption controller 304 notifies a file operation application 302 of the interruption event which is formed by the operation panel 510 of the external operating apparatus 111 and transferred by the interruption transfer system.

Generally, the interruption controller 304 in the embodiment corresponds to an HID (Human Interface Device) class device of the USB which is used for the mouse or keyboard and is constructed by a class driver or its management software. In general, they are implemented in the operation system.

The file operation application 302 executes a preview display and a printing process of the image data on the memory card inserted in the card slot (media slot) of the external operating apparatus 111.

Print control such as activation, end, print setting, image selection, image editing, print start, print stop, and the like of the application 302 is made by using the operation panel 510 of the printer.

The software constructing the file operation application 302 will be described hereinbelow.

An event receiving unit 306 discriminates the interruption event received from the interruption controller 304. When a print setting information event is received, the event receiving unit 306 notifies a print setting information management unit 307 of the event. When an image information event is received, the unit 306 notifies an image data management unit 309 of the event. When an image editing event is received, the event receiving unit 306 notifies an image editing control unit 330 of the event. When a print control event such as print start, print stop, or the like is received, the event receiving unit 306 notifies a print control unit 311 of the event. The image editing control unit 330 executes various image editing processes on an edited image data storing area 331.

The print setting information management unit 307 receives the print setting information event and stores the setting information into a print setting information buffer 308 on the RAM. The print setting information event is constructed by: a print mode selected at present by the printer; a size of paper; a kind of paper; print quality; a layout ID; the number of copies; image correction information; etc.

The print setting information management unit 307 notifies a preview display unit 305 that the print setting information is changed.

The image data management unit 309 receives the image information event, obtains the image data corresponding to the image information from the external operating apparatus 111, and stores it into an image data buffer 310 on the hard disk.

The image information event comprises one or a plurality of image data IDs.

The image data ID is an ID to unconditionally specify the image data in order to obtain specific image data from a plurality of image data recorded in the memory card of the external operating apparatus 111. A file name, an image number, or the like is used as such an ID.

The image data in the embodiment is digital image data photographed by, for example, a digital camera and provided in the image data of a JPEG or TIFF format. The image data management unit 309 has a JPEG decoding function.

Usually, the image photographed by the digital camera includes a thumbnail image of a small size.

The image data management unit 309 separately executes the reading of the thumbnail image and the reading of the real image and manages them, respectively.

The image data management unit 309 notifies the preview display unit 305 that the image information is changed. In this instance, the preview display unit 305 is notified of completion of the reading of the thumbnail image and completion of the reading of the real image, respectively. The thumbnail image is immediately displayed onto the preview image and, thereafter, the real image is displayed, thereby updating the preview display without a delay.

The print control unit 311 receives and discriminates the print control event. When it indicates a print start request, the print control unit 311 notifies a print data generation unit 312 of the print start request. When it indicates a print stop request, the print control unit 311 notifies a print data generation unit 312 of the print stop request.

The print data generation unit 312 obtains the present print setting information from the print setting information buffer 308 via the print setting information management unit 307, obtains the image data from the image data buffer 310 via the image data management unit 309, converts the image data, which is multivalue bit map data in an RGB full color, into binary bit map data of yellow (Y), magenta (M), cyan (C), and black (K) in a raster format in accordance with the print setting information by a zooming process, a halftone process, a complementary color conversion, a binarizing process, etc., and generates a printer command from the obtained bit map data.

The generated printer command is transmitted to the printer 150 via a data transfer unit 313.

If a lack of a memory capacity, an allocating time in a CPU, or the like, or a lack of resources necessary for the printing process is detected during the generation of the print data, the print data generation unit 312 transmits an error event to the print control unit 311 and stops the print data generating process.

The preview display unit 305 obtains the present print setting information from the print setting information buffer 308 via the print setting information management unit 307, obtains the image data from the image data buffer 310, generates a print preview image from the image data in accordance with the print setting information, and displays it onto the display device 109 of the PC 101.

To reflect the operation of the operation panel (corresponding to the operation panel 510 shown in FIG. 2) of the external operating apparatus 111 to the preview display in a real-time manner, each time the image information update event from the image data management unit 309 and the print setting information update event from the print setting information management unit 307 are received, the preview display unit 305 executes the generation of the print preview image and the updating process of the display (display onto the display device 109 of the PC 101) mentioned above.

The preview display unit 305 displays information useful to the user such as size of paper selected at present, kind of paper, and the like in the print setting information by using a character train or an icon expression onto the display device 109 of the PC 101.

In FIG. 2, the external operating apparatus 111 includes the operation panel 510, as a user interface, comprising: an LCD panel; a joy stick; various buttons and switches; and an LED.

The operation panel controller unit 320 controls the operation panel 510 shown in FIG. 2 comprising buttons/switches, LED, and LCD panel and stores operation panel information into an operation panel information buffer 321.

An operation panel controller unit 320 generates various interruption events and transmits them to the PC 101 via a communication interface unit 315.

A memory card controller unit 318 reads out image data from a storage medium (including various media) inserted in a card slot 319.

In the printer 150, a print controller 316 executes the printing process in accordance with a print command received by a communication interface unit 314 and a print result is outputted from a printer engine unit 317.

FIG. 4 is a schematic diagram for explaining a detailed construction of the operation panel 510 of the external operating apparatus 111 shown in FIG. 1.

In the operation panel 510 shown in FIG. 4, reference numeral 508 denotes a print setting button for allowing various print setting menus to be displayed onto the LCD panel 501. Reference numeral 502 denotes a menu operation button which is used when a menu such as print mode, quality, print media, layout, or the like is selected on the LCD panel.

Reference numeral 505 denotes the print start button which is pressed when the buffered print data is printed. Reference numerals 506 and 507 denote function buttons which are allocated to a print stopping function, an image editing function, and the like.

Reference numeral 504 denotes the application activation button which is pressed, for example, when the file operation application 302 on the PC 101 shown in FIG. 3 is activated and the preview display is performed. When the application activation button 504 is pressed, the interruption events are instructed to the interruption controller 304 via the operation panel controller unit 320 and the communication I/F units 315 and 303.

Reference numeral 501 denotes the LCD panel constructed in a manner such that the user operates the print setting select button 508 while confirming items displayed on the panel, so that he can select various items of a print mode, a print start image number, a print end image number, the number of prints, a kind of paper, a size of paper, a layout, print quality, date printing, and image correction. With respect to those print settings, it is also possible to construct so as to allow the file operation application 302 which operates on the PC 101 to have those functions and select a desired one of those items in accordance with an interrupting instruction from the operation panel 510 of the external operating apparatus 111.

Subsequently, details of a processing procedure of the application 302 shown in FIG. 3 will be described.

Figure 5:
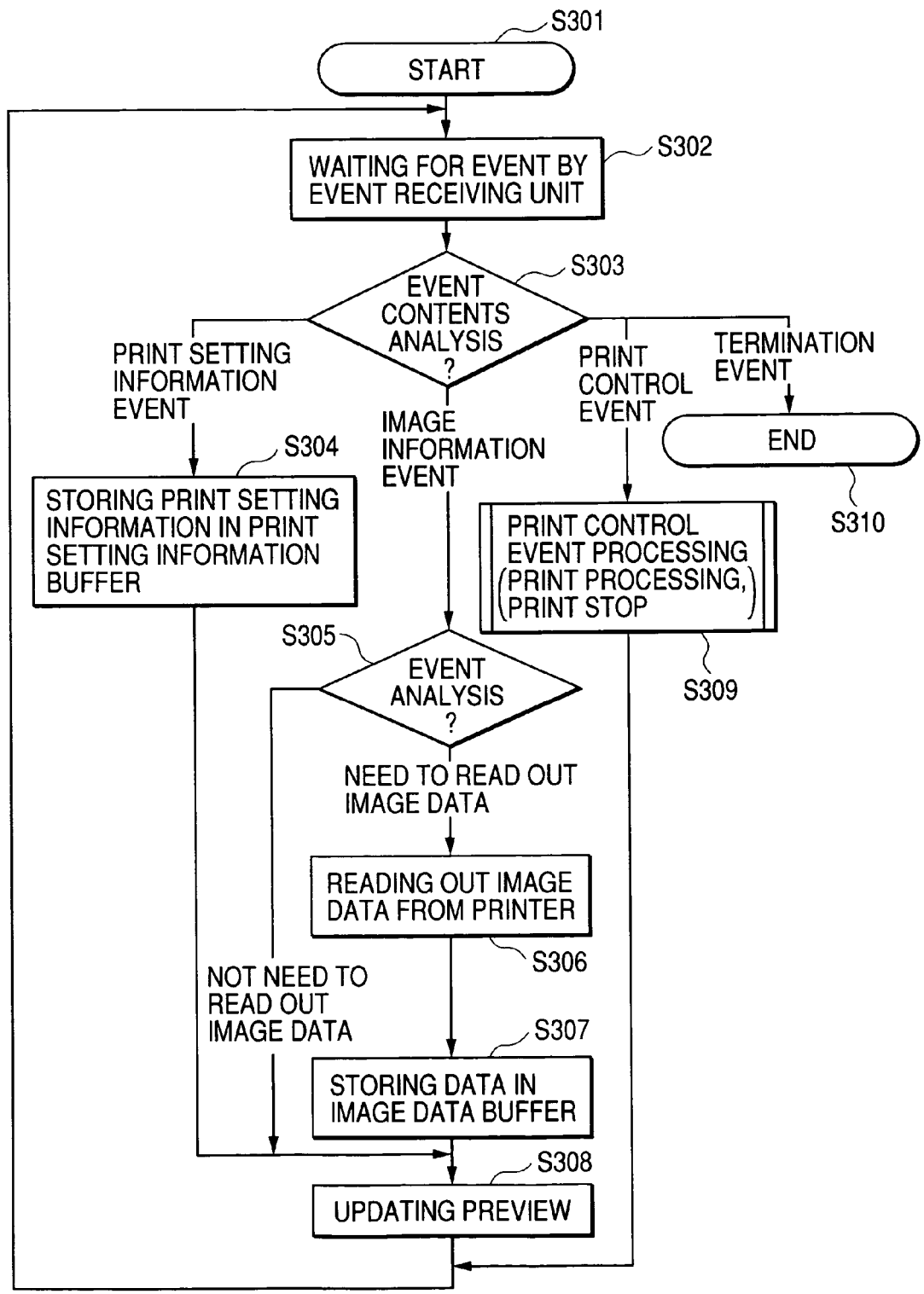
FIG. 5 is a flowchart showing an example of a first data processing procedure in the print system of the embodiment.

FIG. 5 is a flowchart showing an example of a first data processing procedure in the print system according to the invention and corresponds to the data processing procedure by the file operation application 302 shown in FIG. 3. S301 to S310 denote processing steps, respectively.

When the user presses the application. activation button 504 on the operation panel 510 of the user, this processing routine is started (S301). At this time, the application reads out the thumbnail image recorded correspondingly to each image from the memory card and allows a list image for image selection to be displayed onto the display device 109 of the PC.

In step S302, the event receiving unit 306 waits for the interruption event from the interruption controller 304. When the interruption event is received, contents of the event are analyzed in step S303. If it is determined that the contents of the event indicate the print setting information event, the processing routine advances to a process of step S304. If it is determined that the event contents indicate the image information event, the processing routine advances to a process of step S305. If it is determined that the event contents indicate the print control event, the processing routine advances to a process of step S309.

In step S304, the print setting information management unit 307 temporarily stores the print setting information into the memory, for example, the print setting information buffer held on the RAM 103 shown in FIG. 2 and notifies the preview display unit 305 that the print setting information is changed.

In response to such a notification, the preview display unit 305 updates the preview display (S308) in accordance with the notified contents and the processing routine is returned to step S302.

On the other hand, for example, when the image to be printed is selected while confirming the foregoing thumbnail list, the image information event received in the image data management unit 309 is analyzed in step S305. If it is determined that the selected image has been already stored in the image data buffer 310, the updating process of the preview is immediately executed in step S308 and the processing routine is returned to step S302.

If it is determined by the analysis in step S305 that the selected image has not been stored yet in the image data buffer 310, since there is no need to read out the image data from the printer, the image data as a subject image corresponding to the thumbnail is read out from the memory card of the external operating apparatus 111 via the data transfer unit 313 (S306).

In step S307, the read-out image data is stored into the image data buffer 310. In step S308, the updating process of the preview is executed. The processing routine is returned to step S302.

On the other hand, in step S309, various data processings (which will be explained with reference to FIG. 6) based on the print control event received by the print control unit 311 are executed, and then the process routine is returned to step S302.

Figure 6:
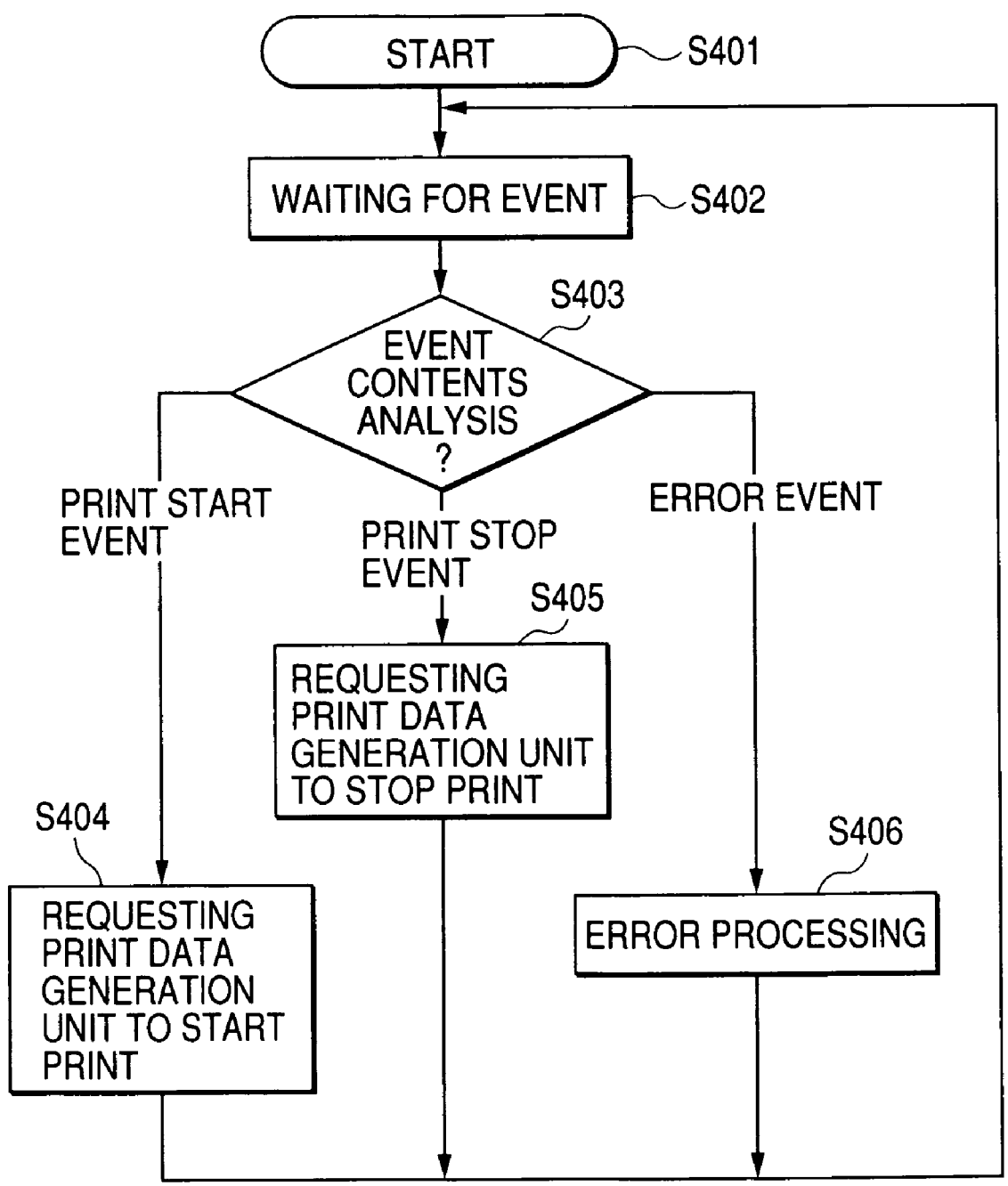
FIG. 6 is a flowchart showing an example of a second data processing procedure in the print system of the embodiment.

FIG. 6 is a flowchart showing an example of a second data processing procedure in the print system according to the invention and corresponds to the detailed data processing procedure in step S309 shown in FIG. 5. S401 to S406 denote processing steps, respectively.

When the processing routine is started in step S401, the system enters a mode to wait for the event from the printer 150 in step S402, and the print control event is received in step S303 shown in FIG. 5, contents of the event are analyzed (S403). When it is determined that they indicate the print start event, a print command is generated by the print data generation unit 312 and transmitted to the printer 150 (S404). The processing routine is returned to step S402.

When it is determined in step S403 that they indicate the print stop event, the printing process in the print data generation unit 312 is stopped (S405) and the processing routine is returned to step S402.

If it is determined that the error event from the print data generation unit 312 is received, the print control unit 311 executes an error process such as error display or the like (S406) and the processing routine is returned to step S402.

Figure 7:
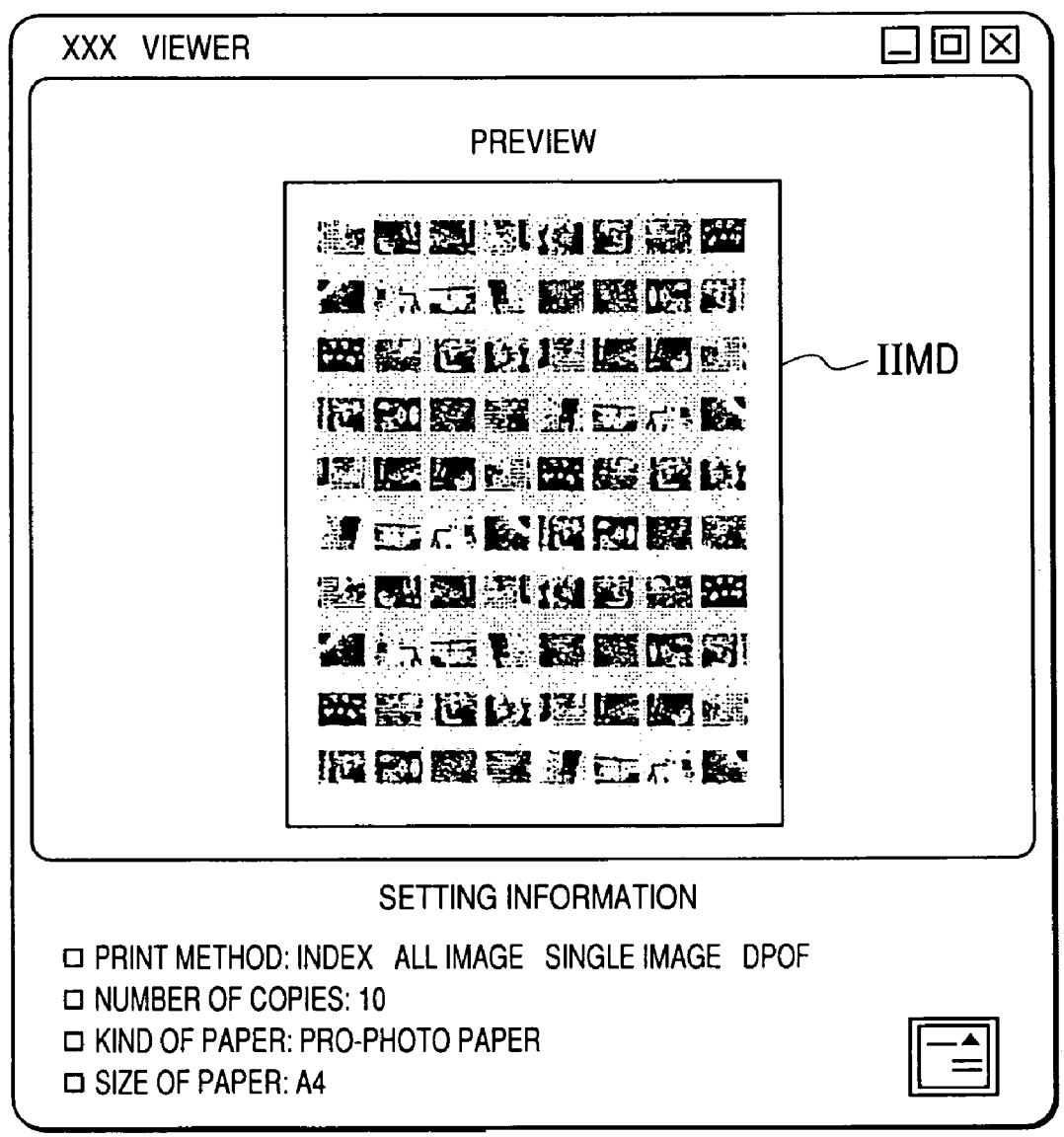
FIG. 7 is a diagram showing an example of a preview display by an image data viewer in the print system of the embodiment.
Figure 8:
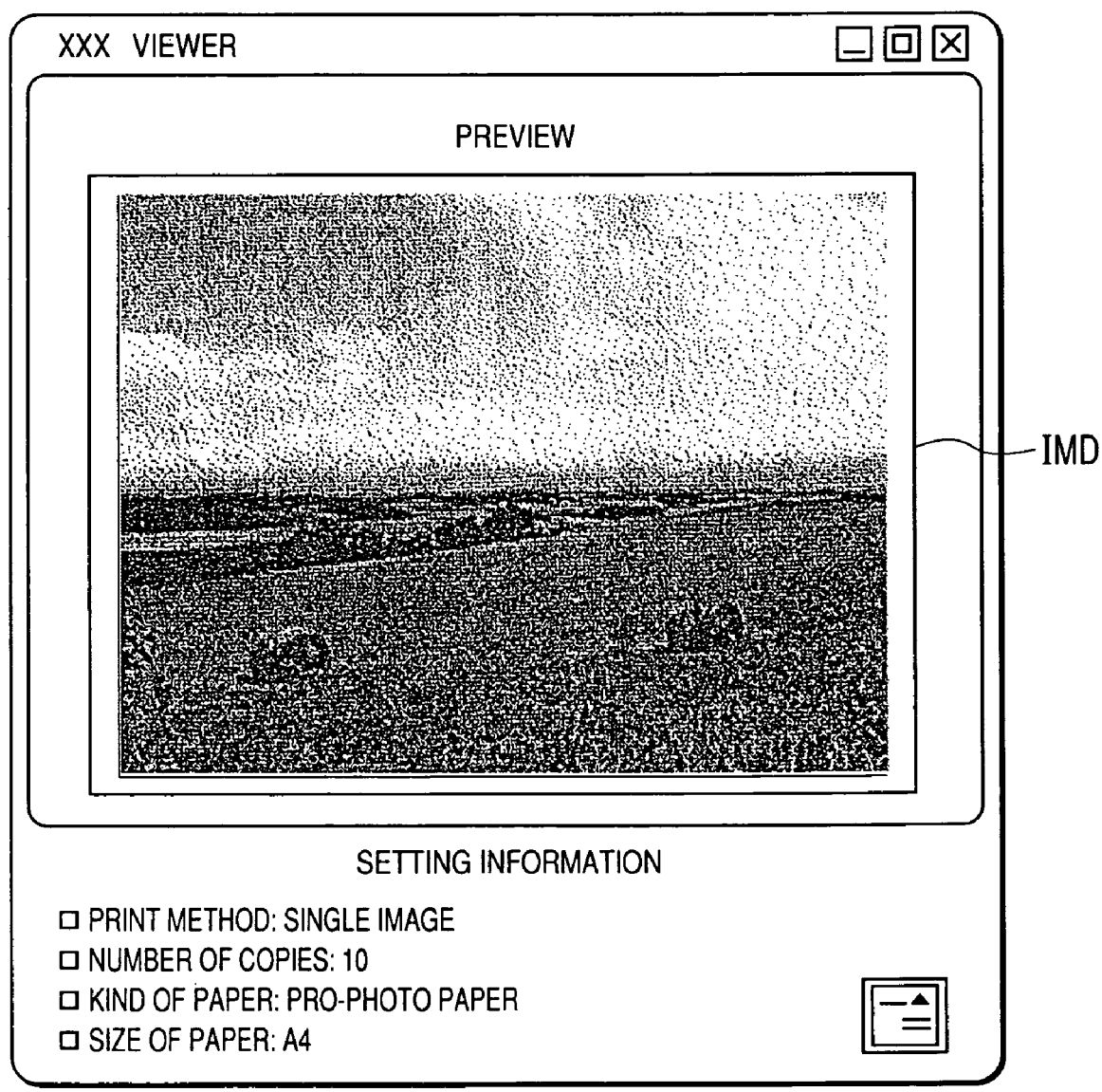
FIG. 8 is a diagram showing an example of the preview display by the image data viewer in the print system of the embodiment.

FIGS. 7 and 8 are diagrams each showing an example of a preview display by an image data previewer in the print system according to the invention. The preview display example shown in FIG. 7 shows a preview display state of an index image. The preview display example shown in FIG. 8 shows a preview display state (display state on, for example, the display device 109 which is connected to the PC 101 and shown in, for example, FIG. 2) of the image (the image data stored in the memory card) selected by the operation panel of the external operating apparatus 111.

The image data which is previewed is updated and-displayed by selecting arbitrary image data by setting the image displayed at present to a base point in accordance with an instruction of the operation panel shown in FIG. 4.

The base point of the image from which the display is started is an arbitrarily set. The invention incorporates not only a case where the display is performed in storing order or time-sequential order but also a case where the display order is changed-and controlled by a key which can be retrieved.

Further, the invention also incorporates a case where, as a function of the file operation application, contents of the image data which is recorded in the memory card are updated every predetermined time and the preview of the image data is cyclically display-controlled.

In the embodiment, since a print format (a printing method, the number of copies, a kind of paper, a size of paper, etc.) which is selected and set by the operation panel 510 is also displayed at the time of the preview display, the user can also simultaneously confirm its setting state.

Further, although the embodiment is described with respect to the example of preview-displaying the image in the memory card by the instruction of the operation panel 510 of the external operating apparatus 111, it is also possible to construct in a manner such that equivalent buttons are arranged in a preview display screen which is displayed by the PC 101 in accordance with convenience of the user, control is made so that the user can also receive the operation of input devices connected to the PC 101, for example, the keyboard 107 and mouse 108 shown in FIG. 2, and in association with the movement of the user, the update instructing operation of the preview can be also executed on either the PC 101 side or the external operating apparatus 111 side.

It is also possible to construct in a manner such that upon previewing, the preview is controlled not on an image unit basis but every unit in which the layout can be displayed, thereby enabling a layout print state to be previewed and enabling the user to confirm the layout print state (for example, a case where a plurality of images are arranged onto paper and outputted, or the like is included) before the start of the printing.

A digital still camera having an LCD display, a cursor key, and the like can be also used as an external operating apparatus 111. In this case, the control function of the external operating apparatus 111 mentioned above needs to be implemented in the digital still camera.

Although the form in which the external operating apparatus is connected to the PC is described in the above embodiment, it is also possible to construct in a manner such that the external operating apparatus is connected to the printer and the print preview similar to that mentioned above can be executed.

In the above description, the system is constructed in a manner such that by operating the application activation button on the operation panel, the system enters a state where the print preview can be performed. As another method, good use convenience can be obtained by constructing in a manner such that the external operating apparatus is connected to the PC (or the printer) by a cable or the like and the foregoing application is activated automatically or by the small number of button operations when the external operating apparatus enters a communicating mode.

In this instance, whether the storage medium in which the images are stored is loaded in the memory card slot or not or whether the image is recorded or not is discriminated. If there is no image data to be printed or if the storage medium is not inserted, it is preferable to prevent the activation of the application. Good use convenience can be also obtained by constructing in a manner such that a message to warn that there is no memory card is displayed to a display unit of the PC or the external operating apparatus.

It is also possible that buttons for setting the size of paper, kind of paper, and the like and means for detecting the type of paper are prepared also on the printer side and the print settings which are determined by them are transmitted to the external operating apparatus.

At this time, the printer driver of the PC can also generate such information and transmit it to the external operating apparatus.

By displaying contents to which the setting has been reflected onto the display device of the external operating apparatus which received the setting information of the printer, the setting state of the printer can be visually confirmed in a real-time manner.

As described above, according to the print system of the invention, the interruption event which is transferred from the external operating apparatus to the host computer is detected every instruction from the operation panel provided for the external operating apparatus, the image data read out from the memory card which can be loaded into the external operating apparatus and the print setting which is made by the operation panel are obtained in response to the detected interruption event, and the print preview display in which the print setting is reflected in a real-time manner to the display device of the host computer and the updating display of the print preview display are controlled. Thus, there is obtained an effect such that it is possible to construct the low-cost and high-speed preview system having excellent use convenience in which the operating instruction from the operation panel provided for the external operating apparatus is reflected in a real-time manner and the print preview of the image data in the memory card which is loaded into the external operating apparatus can be browsed with high picture quality by the user via the display device on the host computer side.

A construction of a data processing program which can be read out by the print system according to the invention will be described hereinbelow with reference to a memory map shown in FIG. 9.

FIG. 9 is a diagram for explaining the memory map of a storage medium for storing various data processing programs which can be read out by the print system according to the invention.

Although not shown in the diagram in particular, information for managing a group of programs which are stored into the storage medium, for example, version information, an implementer, and the like are also stored and there is also a case where information which depends on the OS or the like on the program reading side, for example, icons or the like to identify and display the programs are also stored.

Further, data which depends on the various programs is also managed in the directory. There is also a case where a program for installing the various programs into a computer and, if the program to be installed is a compressed one, a program for decompressing it and the like are also stored.

The functions shown in FIGS. 5 and 6 in the embodiment can be also realized by the host computer in accordance with a program which is installed from the outside. In such a case, the invention is also applied to a case where an information group including the programs is supplied to an output device from a storage medium such as CD-ROM, flash memory, FD, or the like or from an external storage medium via a network.

Naturally, the object of the invention is also accomplished by a method whereby the storage medium in which program codes of software for realizing the functions of the embodiment mentioned above is recorded as mentioned above is supplied to a system or an apparatus and a computer (or a CPU or an MPU) of the system or apparatus reads out and executes the program codes stored.

In this case, the program codes themselves read out from the storage medium realize the novel functions of the invention and the storage medium in which the program codes are stored constructs the invention.

As a storage medium for supplying the program codes, for example, a flexible disk, a hard disk, an optical disk, a magnetooptic disk, a CD-ROM, a CD-R, a magnetic tape, a non-volatile memory card, a ROM, an EEPROM, or the like can be used.

Naturally, the invention incorporates not only a case where a computer executes the read-out program codes, so that the functions of the embodiment mentioned above are realized but also a case where an OS (Operating System) or the like which is operating on the computer executes a part or all of actual processes on the basis of instructions of the program codes and the functions of the embodiment mentioned above are realized by those processes.

Further, naturally, the invention incorporates a case where the program codes read out from the storage medium are written into a memory equipped for a function expanding board inserted in a computer or a function expanding unit connected to a computer, thereafter, a CPU or the like equipped for the function expanding board or the function expanding unit executes a part or all of actual processes on the basis of instructions of the program codes and the functions of the embodiment mentioned above are realized by those processes.

The invention is not limited to the foregoing embodiment but many modifications (including an organic combination of the embodiments) are possible on the basis of the spirit of the invention and are not excluded from the purview of the invention.

The invention is not limited to the foregoing embodiment but many variations and modifications are possible within the scope shown in Claims.

What is claimed is:

1. A print system comprising an external operating apparatus, a host computer which communicates with said external operating apparatus, and a printer which communicates with said host computer, wherein said external operating apparatus comprises:

reading means for reading out image data from a detachable storage medium;

a display unit which displays a print setting screen;

an operation panel which is operative to set print settings in accordance with a print setting instruction provided by a user based on the print setting screen displayed on said display unit;

a button operative to instruct said host computer to preview the image data read out by said reading means;

transmission means for transmitting the image data read out by said reading means, to said host computer in response to said button being operated; and a controller which generates a plurality of interruption events including a print setting information interruption event for causing said host computer to set therein the print settings of the image data transmitted by said transmission means, the print setting information interruption event being generated in accordance with said operation panel setting the print settings after the image data read out by said reading means is transmitted to said host computer by said transmission means so that the generated print setting information interruption event includes the print settings set by said operation panel and is transmitted to said host computer, wherein said host computer comprises:

a receiving unit which receives the image data read out by said reading means and then transmitted by said transmission means from said storage medium, and receives the plurality of interruption events generated by said controller from said external operating apparatus;

a control unit which detects whether the interruption event received by said receiving unit is the print setting information interruption event, and controls print preview display such that the print settings included in the received print setting information interruption event are reflected in the image data received by said receiving unit, every time the print setting information interruption event is detected; and a print control unit which generates print data corresponding to the print settings included in the received print setting information interruption event, wherein said printer prints the print data output from said host computer, and wherein the print settings reflected in the print preview display are the same print settings used to generate print data.

2. A system according to claim 1, wherein said controller generates the interruption event corresponding to a print start instruction.

3. A system according to claim 2, wherein said control unit detects whether the interruption event received by said receiving unit corresponds to the print start instruction, said print control unit outputs to said printer the print data in which the print settings received by the plurality of interruption events received so far are reflected.

4. An information processing apparatus which can communicate with an external operating apparatus including reading means for reading out image data from a detachable storage medium, a display unit which displays a print setting screen, an operation panel which is operative to set print settings in accordance with a print setting instruction provided by a user based on the print setting screen displayed by said display unit, a preview button operative to instruct said information processing apparatus to preview the image data read out by said reading means, transmission means for transmitting the image data read out by said reading means, to said information processing apparatus in response to said preview button being operated, and a controller which generates a plurality of interruption events including a print setting information interruption event for causing said information processing apparatus to set therein the print settings of the image data transmitted by said transmission means, the print setting information interruption event being generated in accordance with said operation panel setting the print settings after the image data read out by said reading means is transmitted to said information processing apparatus by said transmission means so that the generated print setting information interruption event includes the print settings set by said operation panel and is transmitted to said information processing apparatus, and a printer, said apparatus comprising:

a receiving unit which receives the image data and the plurality of interruption events transmitted from said external operating apparatus;

a control unit which detects whether the print setting information interruption event is received by said receiving unit and controls print preview display such that the print settings included in the received print setting information interruption event are reflected in the image data received by said receiving unit, every time the print setting information event is detected; and a print control unit which generates print data corresponding to the print settings included in the received print setting information interruption event and outputting the generated print data to said printer, wherein the print settings reflected in the print preview display are the same print settings used to generate print data.

5. An apparatus according to claim 4, wherein said apparatus receives the interruption event corresponding to a print start instruction from said controller.

6. An apparatus according to claim 5, wherein said control unit detects whether the interruption event received by said receiving unit corresponds to the print start instruction, said print control unit outputs to said printer the print data in which the print settings received by the plurality of interruption events received so far are reflected.

7. A method of controlling a print system comprising an external operating apparatus, a host computer which communicates with said external operating apparatus, and a printer which communicates with said host computer, wherein said method includes a control method for said external operating apparatus, comprising the steps of:

reading out image data from a detachable storage medium;

displaying a print setting screen on a display unit;

setting, with an operation panel, print settings in accordance with a print setting instruction provided by the user based on the print setting screen displayed on the display unit in said displaying step;

operating a button to instruct said host computer to preview the image data read out in said reading step;

transmitting the image data read out in said reading step, to said host computer in response to said button being operated; and generating a plurality of interruption events including a print setting information interruption event for causing said host computer to set therein the print settings of the image data transmitted in said transmitting step, the print setting information interruption event being generated in accordance with the print settings being set in said setting step after the image data read out in said reading step is transmitted to said host computer in said transmitting step so that the generated print setting information interruption event is transmitted to said host computer, wherein said method further includes a control method for said host computer, comprising the steps of:

receiving the image data read out in said reading step and then transmitted in said transmitting step, and receiving the plurality of interruption events generated in said generating step;

detecting whether the interruption event received in said receiving step is the print setting information interruption event and controlling print preview display such that the print settings included in the received print setting information interruption event is reflected in the image data received in said image data receiving step, every time the print setting information interruption event is detected; and generating print data corresponding to the print settings included in the received print setting information interruption event, wherein said method further includes a control method for said printer by which said printer prints printing data output from said host computer, and wherein the print settings reflected in the print preview display are the same print settings used to generate print data.

8. A method of controlling an information processing apparatus which can communicate with an external operating apparatus including reading means for reading out image data from a detachable storage medium, a display unit which displays a print setting screen, an operation panel which is operative to set print settings in accordance with a print setting instruction provided by a user based on the print setting screen displayed on the display unit, a preview button operative to instruct said information processing apparatus to preview the image data read out by said reading means, transmission means for transmitting the image data read out by said reading means, to said information processing apparatus in response to said preview button being operated, and a controller for generating a plurality of interruption events including a print setting information interruption event for causing said information processing apparatus to set therein the print settings of the image data transmitted by said transmission means, the print setting information interruption event being generated in accordance with said operation panel setting the print settings after the image data read out by said reading means is transmitted to said information processing apparatus by said transmission means so that the generated print setting information interruption event includes the print settings set by said operation panel and is transmitted to said information processing apparatus said method comprising:

performing by the information processing apparatus the following:

receiving the image data and the plurality of interruption events transmitted from said external operating apparatus;

detecting whether the print setting information interruption event is received in said receiving step and controlling the print preview display such that the print settings included in the received print setting information interruption event are reflected in the image data received in said receiving step, every time the print setting information is detected; and generating print data corresponding to the print settings included in the received print setting information interruption event and outputting the generated print data to said printer, wherein the print settings reflected in the print preview display are the same print settings used to generate print data.

9. A non-transitory computer-readable storage medium storing a program for causing a computer to execute a method of controlling a print system comprising an external operating apparatus, a host computer which communicates with said external operating apparatus, and a printer which communicates with said host computer, wherein said method includes a control method for said external operating apparatus and comprises the steps of:

reading out image data from a detachable storage medium;

displaying a print setting screen on a display unit;

setting, with an operation panel, print settings in accordance with a print setting instruction provided by a user based on the print setting screen displayed on the display unit;

operating a button to instruct said host computer to preview the image data read out in said reading step;

transmitting the image data read out in said reading step, to said host computer in response to said button being operated; and generating a plurality of interruption events including a print setting information interruption event for causing said host computer to set therein the print settings of the image data transmitted in said transmitting step, the print setting information interruption event being generated in accordance with the print settings being set in said setting step after the image data read out in said reading step is transmitted to said host computer in said transmitting step so that the generated print setting information interruption event includes the print settings set in said setting step and is transmitted to said host computer, wherein said method further includes a control method for said host computer and comprises the steps of:

receiving the image data read out in said reading step and then transmitted in said transmitting step, and receiving the plurality of interruption events generated in said generating step;

detecting whether the interruption event received in said receiving step is the print setting information interruption event, and controls print preview display such that the print settings included in the received print setting information interruption event are reflected in the image data received in said image data receiving step, every time the print setting information interruption event is detected; and generating print data corresponding to the print settings included in the received print setting information interruption event, wherein said method further includes a control method for said printer by which said printer prints the print data output from said host computer, and wherein the print settings reflected in the print preview display are the same print settings used to generate print data.

10. A non-transitory computer-readable storage medium storing a program for causing a computer to execute a method of controlling an information processing apparatus which can communicate with an external operating apparatus including reading means for reading out image data from a detachable storage medium, a display unit which displays a print setting screen, an operation panel which is operative to set print settings in accordance with a print setting instruction provided by a user based on the print setting screen displayed on the display unit, a preview button operative to instruct said information processing apparatus to preview the image data read out by said reading means, transmission means for transmitting the image data read out by said reading means, to said information processing apparatus in response to said preview button being operated, and a controller for generating a plurality of interruption events including a print setting information interruption event for causing said information processing apparatus to set therein the print settings of the image data transmitted by said transmission means, the print setting information interruption event being generated in accordance with said operation panel setting the print settings after the image data read out by said reading means is transmitted to said information processing apparatus by said transmission means so that the generated print setting information interruption event includes the print settings set by said operation panel and is transmitted to said information processing apparatus, and a printer, said method comprising the steps of:

receiving the image data and the plurality of interruption events transmitted from said external operating apparatus;

detecting whether the print setting information interruption event is received in said receiving step and controlling the print preview display such that the print settings included in the received print setting information interruption event are reflected in the image data received in said receiving step, every time the print setting information interruption event is detected; and generating print data corresponding to the print settings included in the received print setting information interruption event and outputting the generated print data to said printer, wherein the print settings reflected in the print preview display are the same print settings used to generate print data.

11. A print system comprising an external operating apparatus, a host computer which communicates with said external operating apparatus, and a printer which communicates with said host computer, wherein said external operating apparatus comprises:

reading means for reading out image data from a detachable storage medium;

a display unit which displays a print setting screen;

an operation panel which is operative to set print settings in accordance with a print setting instruction provided by a user based on the print setting screen displayed on said display unit;

a button operative to instruct said host computer to preview the image data read out by said reading means;

transmission means for transmitting the image data read out by said reading means, to said host computer in response to said button being operated; and a controller which generates a plurality of interruption events including a print setting information interruption event for causing said host computer to set therein the print settings of the image data transmitted by said transmission means, the print setting information interruption event being generated in accordance with the print setting instruction being provided to said operation panel after the image data read out by said reading means is transmitted to said host computer by said transmission means so that the generated print setting information interruption event includes the print settings provided to said operation panel and is transmitted to said host computer, wherein said host computer comprises:

a receiving unit which receives the image data read out by said reading means and then transmitted by said transmission means from said storage medium, and receives the plurality of interruption events generated by the controller from said external operating apparatus;

a control unit which detects whether the interruption event received by said receiving unit is the print setting information interruption event, and controls print preview display such that the print settings included in the received print setting information interruption event are reflected in the image data received by said receiving unit, every time the print setting information interruption event is detected; and a print control unit which generates print data corresponding to the print settings included in the received print setting information interruption event, wherein said printer prints the print data output from said host computer, wherein the print settings reflected in the print preview display are the same print settings used to generate print data, wherein said printer includes print setting means therein and transmits print settings set by said print setting means to said external operating apparatus, and wherein the print settings set by said print setting means included in said printer are reflected in a display by said display unit of said external operating apparatus.

* * * * *